United States Patent [19]
Van Cleve et al.

[11] Patent Number: 5,850,039
[45] Date of Patent: Dec. 15, 1998

[54] CORIOLIS FLOWMETER HAVING AXIALLY COMPLIANT CASE ENDS

[75] Inventors: Craig Brainerd Van Cleve, Lyons; Roger Scott Loving, Boulder; Gregory Treat Lanham, Longmont, all of Colo.

[73] Assignee: Micro Motion, Boulder, Colo.

[21] Appl. No.: 807,059

[22] Filed: Feb. 27, 1997

[51] Int. Cl.⁶ ..................................................... G01F 1/84
[52] U.S. Cl. ....................................................... 73/861.357
[58] Field of Search ........................ 73/861.355, 861.356, 73/861.357

[56] References Cited

U.S. PATENT DOCUMENTS

| | | | |
|---|---|---|---|
| 2,602,330 | 7/1952 | Kollsman | 73/104 |
| 3,355,944 | 12/1967 | Sipin | 73/861.355 |
| 4,768,384 | 9/1988 | Flecken et al. | 73/861 |
| 4,793,191 | 12/1988 | Flecken et al. | 73/861 |
| 5,218,873 | 6/1993 | Lang | 73/861.357 |
| 5,381,697 | 1/1995 | Van Der Pol | 73/861 |

FOREIGN PATENT DOCUMENTS

| | | |
|---|---|---|
| 2 598 801 | 11/1987 | France . |
| 0 759 542 A1 | 2/1997 | Japan . |
| 0 261 435 A2 | 3/1988 | Switzerland . |
| 0 448 913 A1 | 10/1991 | Switzerland . |

*Primary Examiner*—Richard Chilcot
*Assistant Examiner*—Harshad Patel
*Attorney, Agent, or Firm*—Duft, Graziano & Forest P.C.

[57] ABSTRACT

A flowmeter positioned inside a case having compliant membranes for case ends. The membranes have an axial compliance sufficient to allow the flow tube to expand/contract freely in response to thermal changes without a permanent deformation of the flow tube.

19 Claims, 4 Drawing Sheets

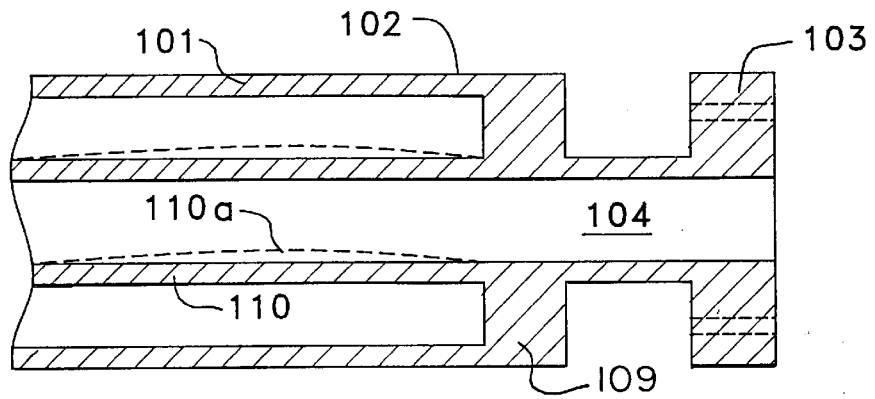
FIG. 7 (PRIOR ART)
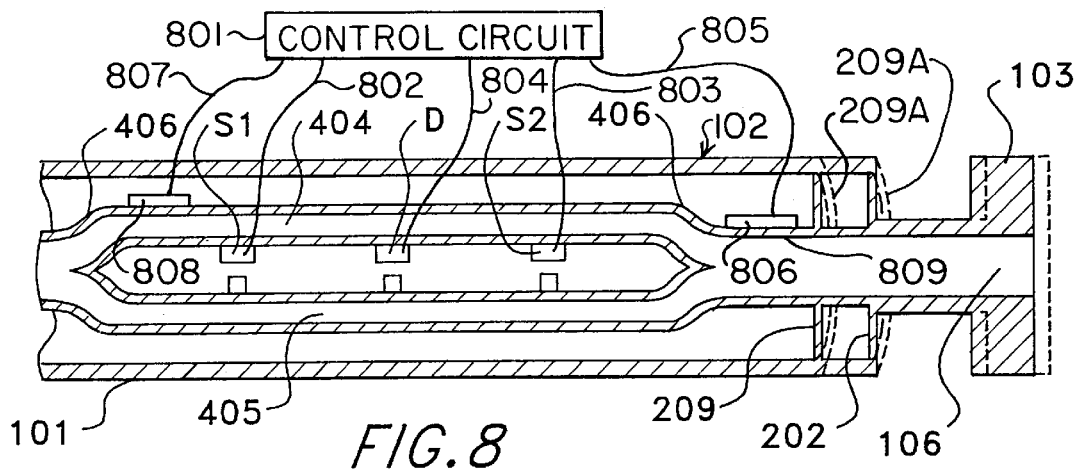
FIG. 8
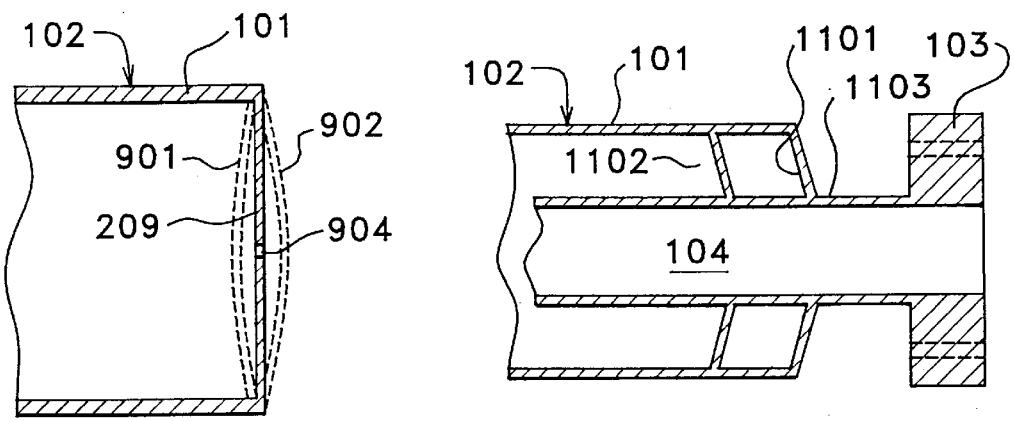
FIG. 9
FIG. 11

CORIOLIS FLOWMETER HAVING AXIALLY COMPLIANT CASE ENDS

FIELD OF THE INVENTION

This invention relates to Coriolis flowmeters, and in particular, to a Coriolis flowmeter enclosed by a case having an axially compliant end.

PROBLEM

Straight tube type Coriolis mass flowmeters are known in the art. They may consist of flowmeters having a single straight flow tube, a cylindrical balance tube surrounding the flow tube, together with a larger cylindrical case that encloses both the flow tube and the balance tube. The balance tube is rigidly fixed at each end to the flow tube by a brace bar. The flow tube is affixed to ends of the case which comprise thick end plates. The flow tube extends beyond the case ends and is connected to a pipeline. The primary purpose of the flowmeter case is to provide physical protection for the flowmeter elements enclosed within the case. These elements may comprise sensitive devices, such as drivers, sensors, and associated electronic elements. It is desired that these elements be physically protected from the environment in which the flowmeters are operated. This protection is provided by the case which is advantageously made of strong material of sufficient thickness.

In operation, the flow tube is electromechanically vibrated out-of-phase with respect to the balance tube which is provided to reduce the vibrations that would be associated with a single unbalanced flow tube. The vibration imparts a Coriolis acceleration to material flowing through the flow tube. The reaction force to this Coriolis acceleration results in a slight distortion to the vibration mode shape of the flow tube. This distortion is useful and is measured by sensors connected to, or associated with, the flow tube. The sensors may be either of the velocity or displacement type. The material flow rate in the flow tube is proportional to the time or phase delay between the signals generated by two such sensors positioned along the length of the straight flow tube. Output signals of the sensors are applied to electronic apparatus which derives desired information, such as mass flow rate, for the material in the flow tube.

Dual straight tube Coriolis flowmeters are also known. These are similar to the single straight tube flowmeters except that they have a second flow tube in parallel with the first flow tube. The second flow tube replaces the balance bar of the single flow tube embodiment. The two flow tubes are connected at their ends to flow diverter manifolds which divide the material flow between the two flow tubes. Dual flow tube meters may or may not have brace bars connecting the flow tubes to each other. The flow tubes of dual tube Coriolis mass flowmeters vibrate out-of-phase with respect to each other rather than out-of-phase with a balance bar. Other than this, their operation is identical to a single straight tube flowmeter.

Mass flow measurement in both types of straight tube Coriolis flowmeters is dependent upon the flow tube distortion or flexing resulting from the Coriolis forces generated by the material flow and the concurrent electromechanical vibration to which the flow tube is subjected. It is often desired that Coriolis mass flowmeters have an accuracy that approaches 0.1 percent of reading. It is therefore necessary that the distortion of the flow tube be dependent solely upon the generated Coriolis forces, rather than being affected by external forces and stresses including those generated by differences in operating temperatures between the various portions of the flowmeter. These thermal stresses can generate undesirable axial tension or compression in the flow tubes.

Axial tension tends to stiffen flow tubes and make them less responsive to the generated Coriolis forces. This results in a less sensitive flowmeter and an under reporting of the true flow information generated by the Coriolis forces. Likewise, axial compression softens the flow tube and results in an over reporting of the generated Coriolis flow information. Traditionally, manufactures of straight tube Coriolis flowmeters have made the case ends extremely rigid so that forces generated by externally applied loads from connected pipelines are transferred by the rigid case ends to the case rather than to the flow tubes. This successfully isolates flow tubes from external loads, but the rigidity of the case ends as well as the case causes problems resulting from thermal expansion/contraction of the flow tube and temperature differences between the flow tube and the flowmeter case.

In straight tube Coriolis flowmeters, the temperature differences that often exist between the material within the flow tube and the air external to the flowmeter case can cause the flow tube to have a different temperature than the case. This results in a difference in the amount of thermal expansion of the flow tube as compared to that of the case. The rigid case ends inhibit this differential expansion and generate an axial force that compresses (or stretches) the flow tube axially resulting in high axial stress in the flow tube and errors in the indicated flow rate.

A temperature differential between a flow tube and its case results in axial stresses on the flow tube of either of the axial compression or axial tension type. In addition to affecting the flowmeter accuracy, these stresses can exceed the yield stress of the material comprising the flow tube. An axial tension stress can tear the flow tube ends apart from the case ends or can tear the flow tube itself. The stress can also permanently deform the flow tube so as to permanently change its calibration factor and render it useless. For example, if a stainless steel flow tube is 20 inches long and is 200° F. hotter than the case, it will attempt to expand 0.036 inches more than the case. If the case and case ends are relatively rigid, a compressive stress will result in the flow tubes of approximately 50,000 pounds per square inch. This stress may be sufficiently high so as to permanently yield or deform the flow tube. Similar conditions exist when the flow tube is colder than the case except that the stress is tensile rather than compressive.

Two means are traditionally used to lessen thermally induced stresses. The most common of these is to make the flow tube out of a material having a lower co-efficient of thermal expansion than the material from which the case is made. Titanium is typically used for the flow tube because of its low co-efficient of expansion and good corrosion resistance. Stainless steel which has approximately twice the thermal coefficient of expansion of titanium is then used for the case. The temperature of the case is determined by the inflow of heat from the hotter (in this example) flow tube and the loss of heat to the cooler atmosphere. By properly designing the conduction path from the flow tube to the case, the flowmeter is designed so that the case equilibrium temperature is half way between the flow material temperature and the ambient air temperature of the case. Because the expansion coefficient of the case is twice that of the flow tube, this results in a flow tube axial stress that is independent of the fluid temperature. Furthermore, because of titanium's lower expansion coefficient and lower modulus of elasticity, the possibility of damaging the meter through thermal stresses is greatly reduced.

There are several problems with this design. The most significant is that it only works at conditions of thermal equilibrium. If the material temperature in the flow tube suddenly changes, the flow tube temperature changes almost instantly while it takes time for the case temperature to follow the change. During this transient period, the flow tube is axially stressed resulting in measurement error.

Another problem when using materials of different temperature coefficients to reduce tube thermal stress is that the flow tube is only stress free at a single ambient temperature no matter what the fluid temperature. This is because the case equilibrium temperature is half way between the tube and ambient temperatures. Since there is only one case temperature for each fluid temperature that will result in a stress free flow tube, it follows that there is only one ambient temperature that will result in a stress free flow tube. This is easily illustrated by the simple case where the fluid and ambient (and tube and case) temperatures are the same. If the flow tube is stress free when the tube and case are 70°, then the tube is in tension when the tube and case temperatures are 100° since the steel case attempts to expand more than does the titanium tube. On the other hand, if the tube and case are 40°, the case contracts more than the flow tube so that the flow tube is under compression.

A third significant problem with making the case and the flow tube of different materials is the cost of manufacturing. Titanium is expensive and difficult to fabricate. It cannot be welded to stainless steel by conventional processes and can only be brazed to the stainless steel case with difficulty.

The other widely used practice and method of reducing thermally induced tube stresses is to design a geometric strain relief into the flow tube. Bent tube flowmeters fall into this category. This includes those whose flow tubes are U shaped, V shaped, as well as all other flow tubes having an irregular shape other than straight. With straight tube flowmeters, the strain relief is traditionally located between the case end and a brace bar element near the case end. In this location the flow tube is dynamically inactive and thus the nature of the strain relief does not effect the dynamics of the vibrating portion of the flow tube. Among the various designs of strain relief used are o-ring, slip joints, metal bellows, and a reduction in flow tube diameter which serves the function of a diaphragm. These strain relief methods operate adequately to perform their intended function, but they have their own unique problems.

The primary problem with the bellows and slip joint designs is that they are not easily cleanable. This is a significant problem in that cleanability is one of the most common reasons that customers give in selecting a straight tube flowmeter. Flowmeters that use a reduction in flow tube diameter near the tube ends for strain relief often suffer from the disadvantageous of high fluid pressure drop. Other geometric designs exist, but they all suffer from the disadvantageous such as cleanability, pressure drop, or drainability.

The above has discussed the problems associated with the thermal stress relationship between flow tubes and a surrounding case. In a single tube flowmeter having a balance tube affixed to the flow tube, the relationship between the balance tube and the flow tube is the same as between the case and the flow tube in so far as temperature differences and thermal stresses are concerned. The balance tube is normally rigidly affixed to the flow tube by the end portions of the balance tubes. Thus, the expansion problems between the flow tube and the balance tube are the same as those above described between the flow tube and the case.

It should also be appreciated that although there are various techniques for minimizing the problem of flow tube expansion/contraction for flowmeters having thick noncompliant case ends, none are without disadvantages. In particular, the problems of thermal transients and varying ambient temperatures remain unsolved.

SOLUTION

The present invention overcomes the above described problems and achieves an advance in the art providing a flowmeter having a case in which the flow tubes are connected to axially compliant membranes which function as case ends and balance bar ends. The axial compliance of the membranes comprising the case ends, and/or balance bar ends (hereinafter membranes) allows the flow tubes to contract and expand relative to the case and balance bar with reduced axial stress on the flow tubes. This allows the flow tube, the case, and the balance bar to be made of the same material. The present invention also eliminates the need for a temperature measurement of the case and the balance bar as well as the need for compliant devices such as bellows, and the like, to be part of the flow tubes which can cause cleanability and dynamic problems.

The case end membranes in accordance with the present invention may advantageously consist of thin sheets of material such as stainless steel. The membranes are oriented perpendicular to the longitudinal axis of the flow tube. The periphery of the membrane is connected to the case and the center portion of the membrane is attached to the flow tubes which project through it for connection to an external pipeline. Because the membranes are relatively thin compared to their radial or transverse dimension, their center portions that can easily move in an axial direction. The ratio of the radial or transverse dimension to that of the thickness dimension is at least 16 to 1. Since the flow tube is connected to the center portion of the membrane, the flow tube can move easily in the axial direction relative to the case. The motion of the flow tube in the radial direction is limited by the membrane.

Either a single or a pair of membranes may be provided at one or both ends of the case. The use of a single end membrane would allow a bending or pivoting moment of a connected pipeline to be transferred within the flowmeter case to the flow tube. This could damage the flowmeter or possibly affect its accuracy. Therefore, double membranes are preferably used at a case end. Because of their radial stiffness and the physical separation between them, the use of double membranes enable the flow tube to resist bending moments and prevent external bending loads from being transferred to the flow tube while still allowing axial motion between the case and the flow tube due to thermal expansion.

Further in accordance with the invention, membranes connect each end of the balance tube with the flow tube for the same reasons above described. The balance tube membranes may comprise either a single or two diaphragm like plates separated by suitable distance from each other at each end of the balance tube. Like the case end membranes, double membranes are advantageously used on the balance tube to prevent the transmission of bending moments past the balance tube ends. In the case of the balance bar, however, the bending moments of concern are generated by the vibratory motion of the flow tube. Preventing any flow tube bending moments from extending beyond the balance tube prevents the shaking of the entire flowmeter which can lead to meter inaccuracy and an increase in the power required to drive the vibrating flow tube. The double membranes of the balance tube, in a manner similar to the case end membranes, allow differential expansion between the flow tube and the balance tube.

The use of compliant case end membranes and compliant balance tube end membranes allows differential thermal expansion among the various meter components with relatively little resultant flow tube stress. The compliant membranes do however subject the flow tubes to axial loads applied by the pipeline. Good pipeline connection practices can reduce these external loads to a level that does not significantly effect meter performance. For applications requiring very high accuracy, a strain gage or similar load or displacement measuring device can be used to measure the axial load imposed by the pipeline. The strain or load measurements can be used to compensate for any changes in meter sensitivity caused by the axial loading. The strain gage can be placed on the flow tube, pipeline adjacent to the meter, or any place sensitive to the axial load.

DESCRIPTION OF THE DRAWINGS

These and other aspects of the invention can be better understood with reference to a reading of the following detailed description taken in conjunction with the drawings in which;

FIG. 7 discloses the tube deflection resulting from the differential expansion of the flow tube of the embodiment of FIG. 1.

FIG. 8 discloses deflection of the case termination member resulting from the differential expansion of the flow tube of the embodiment of FIG. 4.

FIG. 9 discloses two possible deflections of a flat diaphragm termination member in the presence of a temperature gradient whereby the central region is of a higher temperature than the peripheral region.

FIG. 11 discloses a flowmeter case having a pair of case end members at each case end and constructed in accordance with the case end of FIG. 10.

DETAILED DESCRIPTION

Figure 1:
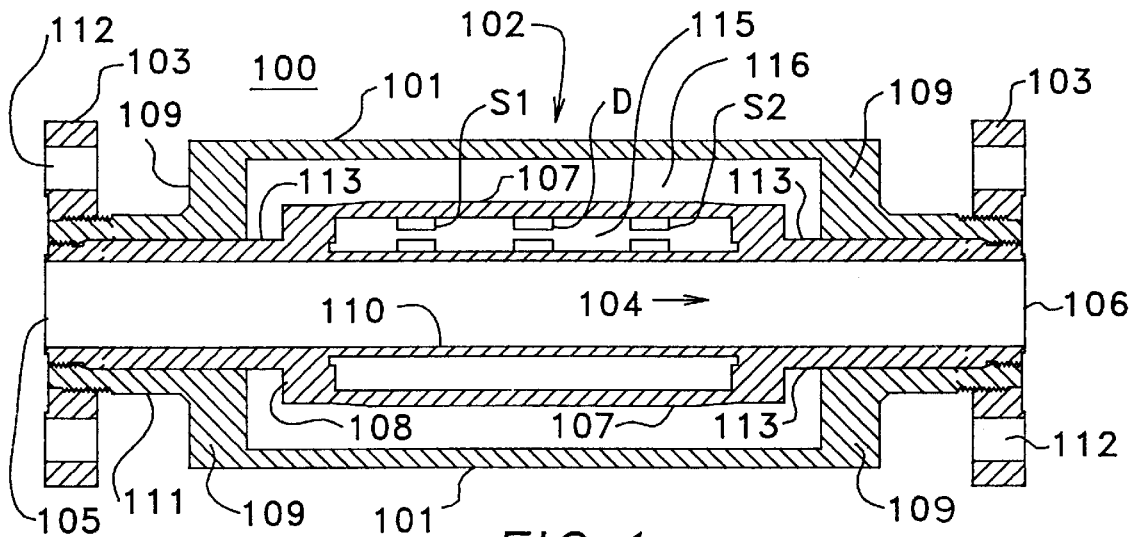
FIG. 1 discloses a prior art straight tube Coriolis flowmeter.

FIG. 1 discloses a typical prior art straight tube Coriolis flowmeter 100 having flanges 103 at each end that enable it to be coupled to a pipeline by means of bolts inserted through flange openings 112. Flowmeter 100 has a single flow tube 104 enclosed within case 102 having walls 101 and case end members 109 connected by elements 111 to flanges 103. Flow tube 104 is encased by balance tube 116 having balance end members 108 coupled to flow tube 104 and by element 113 to case end members 109. Flow tube 104 has an inlet 105 and an outlet 106.

Driver D and a left sensor S1 and a right sensor S2 are positioned in the space 115 between the wall 107 of balance tube 116 and wall 110 of flow tube 104. As is well known in the art driver D, which may comprise a magnet and coil combination, is activated by electronic circuitry (not shown) to oscillate the flow tube wall 110 transversely with respect to its longitudinal axis. Sensors S1 and S2 detect these vibrations as well as the Coriolis induced tube deformation caused by the flow of material through flow tube 104 and the concurrent transverse oscillations. The output signals generated by sensors S1 and S2 from the oscillations are applied to associated circuitry (not shown) which determines the phase or time difference between the output signals of sensors S1 and S2, and from this information, derives information concerning the flowing material including its mass flow rate.

As previously mentioned, the mass flow measurements of a Coriolis flowmeter is dependent upon the flexing of flow tube 104 in response to the generated Coriolis forces to which the flow tube is subjected. In order to achieve a desired accuracy of 0.1 percent of reading, it is necessary that the distortion of the flow tube be dependent solely upon the generated Coriolis forces rather than being effected by other factors including axial stresses resulting from the differences in operating temperature between the various portions of the flowmeter. With respect to the flowmeter of FIG. 1, it is a common practice to make case ends 109 extremely stiff so the external forces do not influence flow tube 104. Although this technique successfully isolates flow tube 104 from external forces, the rigidity of case ends 109 causes problems associated with differences in operating temperature between flow tube 104 and case 102 including the case wall 101 and case ends 109. These temperature differences can result in high axial stress in flow tube 104. If the material in flow tube 104 is sufficiently warmer than the case temperature, the flow tube attempts to expand more than does case 102 including the rigid case ends 109. The rigid case ends inhibit this attempted expansion by flow tube 104 and generate an axial force that compresses flow tube 104. This temperature differential can cause the flow tube 104 to bow as shown in FIG. 7. This can cause the flow tube 104 to permanently deform and destroy its accuracy for the detection of Coriolis forces. In FIG. 7, walls 110 of flow tube 104 represent the normal or undistorted state of the flow tube walls 110 of FIG. 1. The dashed lines 110a represent the bowed deformed state of flow tube walls 110 resulting from a flow tube 104 temperature that is significantly warmer than the temperature of case 102 including its outer walls 101 and its case ends 109. The thicknesses of case ends 109 resists the attempted axial expansion of flow tube walls 110 and in so doing, cause walls 110 to assume a deformed bowed position shown by the dotted lines 110a.

Conversely, if the temperature of flow tube 104 is significantly lower than that of case 102, the case attempts to expand more than the flow tube. In so doing, the expansion of the case attempts to stretch the flow tube 104 axially and stiffens the flow tube. If this temperature differential is sufficient, the axial tension can tear flow tube 104 from case ends 109 and render the flowmeter useless.

It can be seen from the above, that the prior art attempts of using massive case material, including massive case ends, to counteract the thermal expansion and compression of flow tubes is not satisfactory and in some instances where the temperature differentials are extreme, can result in a destruction of the flow tube itself or a permanent loss in the accuracy of the input information generated by the sensors affixed to the flow tube.

Figure 2:
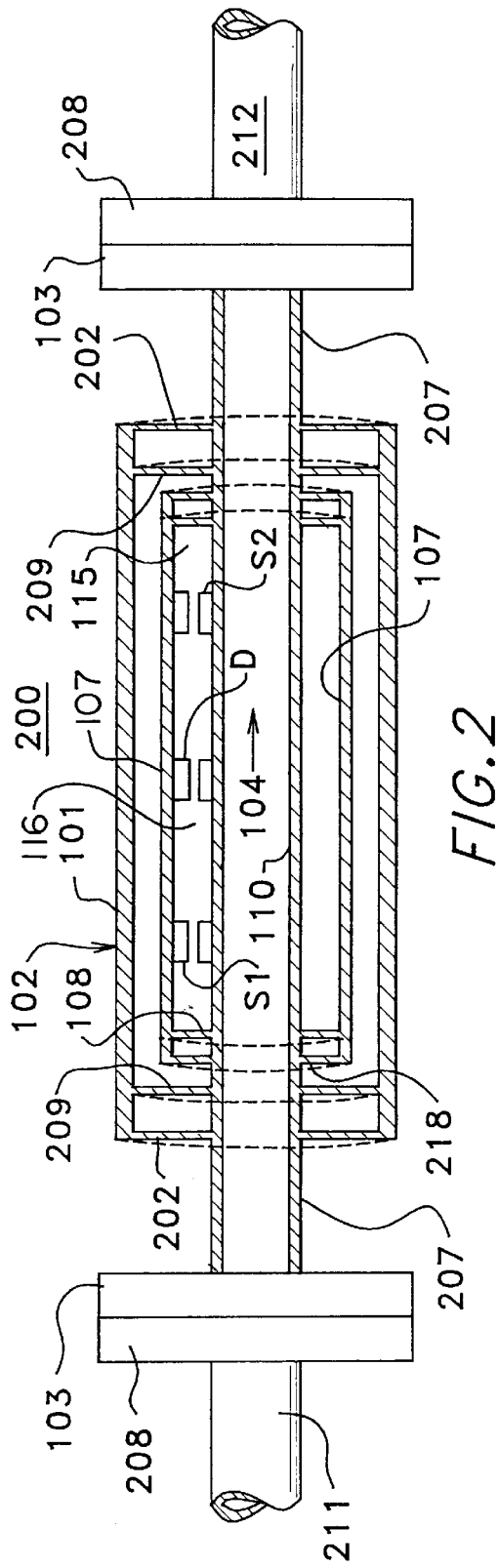
FIG. 2 discloses a single straight tube Coriolis flowmeter embodying the present invention.
Figure 3:
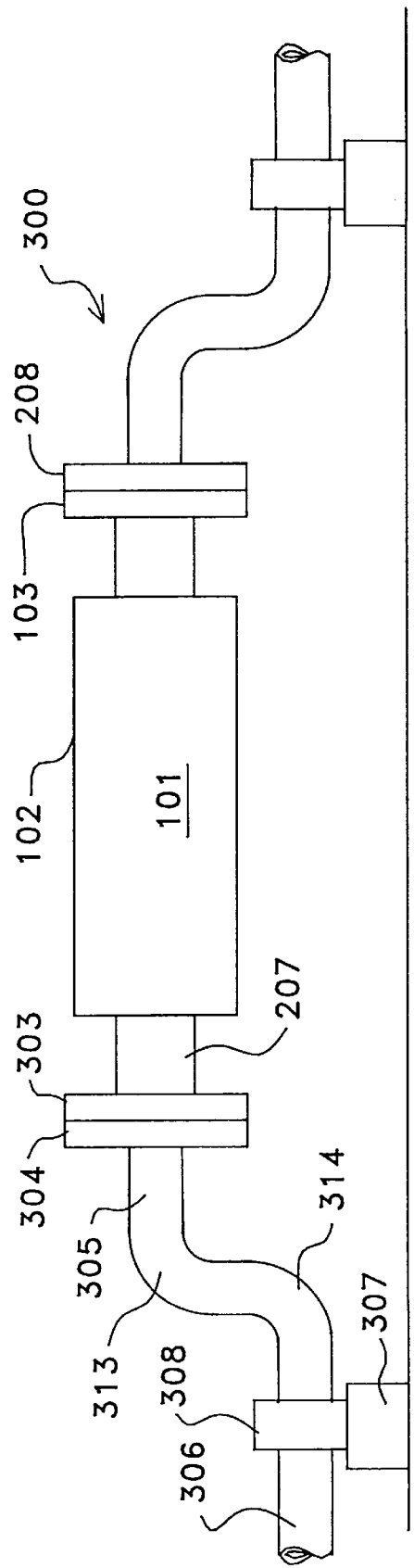
FIG. 3 discloses how the flowmeter of FIG. 2 may be coupled to a pipeline.

Description of FIGS. 2 and 3

FIG. 2 shows first possible exemplary embodiment of the present invention as comprising a flowmeter 200 having a single flow tube 104 positioned within a case 102 having walls 101 and case end membranes 202 and 209 at each case end coupled by elements 207 to flanges 103 which is coupled by flanges 208 to pipelines 211 and 212. Flow tube 104 has a wall 110 similar to flow tube 104 of FIG. 1 wherein it has a flow tube 104 and its wall 110 is surrounded by a cylindrical balance bar 116 having a wall 107. Each end of balance bar wall 107 is attached by a pair of membranes 108 and 218 to wall 110 of flow tube 104. Driver D1 and sensors S1 and S2, are positioned in opening 115 between walls 107 of balance bar 116 and wall 110 of flow tube 104.

The major difference between the embodiment of FIG. 1 and that of FIG. 2, is that the embodiment of FIG. 2 has a pair of membranes 202 and 209 at each end of case 102 to couple case 102 to flow tube 104. Membranes 202 and 209 are axially compliant and relatively thin compared to the single rigid case end 109 of FIG. 1. Changes in the length of flow tube 104 due to thermal changes cause the compliant membranes 209 and 202 to flex and minimize axial stresses on flow tube 104.

Flow tube 104 contracts or expands axially due to thermal changes. These axial changes are transmitted by flow tube elements 207 to flanges 103 and flanges 208 which are coupled to pipelines 211 and 212. Pipeline 211 and 212 is supported by members 308 and 307 and may be provided with elbow members 313 and 314 of FIG. 3 which flex in response to changes in the length of flow tube 104. Elbows 313 and 314 absorb these changes in length of flow tube 104 and prevent them from being transmitted via element 305 and 300 to pipeline 216 and 217. Flanges 304, 303 are comparable to flanges 208, 103 of FIG. 2. Elbows 313 and 314 also prevent changes in the length of pipeline 306 from applying axial stresses to flow tube 104 within case 101 on FIG. 3.

Figure 4:
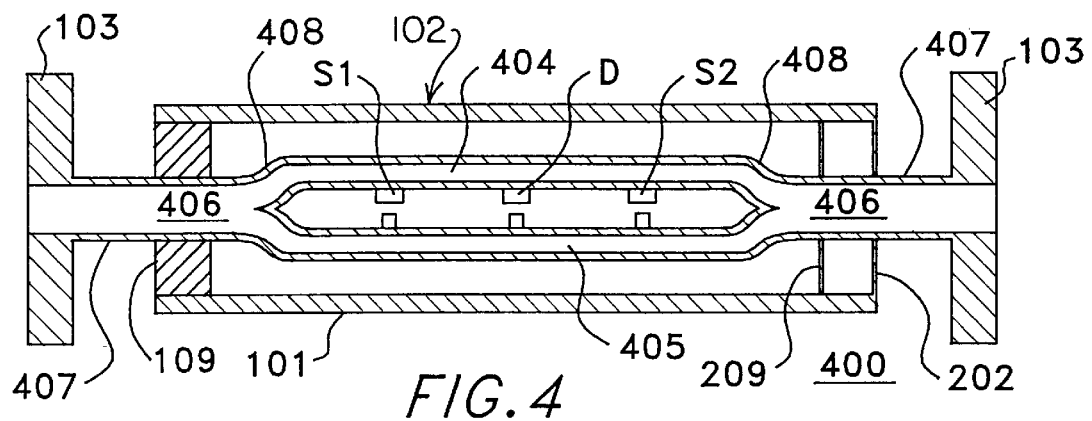
FIG. 4 discloses a Coriolis flowmeter having a pair of straight tubes.

Description of FIG. 4

FIG. 4 discloses another possible exemplary embodiment of the invention as comprising a dual straight tube flowmeter 400 housed within case 102. Case 102 of FIG. 4 is similar to case 102 of FIG. 2 in that it has a cylindrical wall portion 101, a pair of membranes 209 and 202 at the right end of case 102, a thick rigid case end 109 on the left end of case 102, and element 407 extending from flow diverter manifold 406 through rigid left case end 109 and membranes 209 and 202 on the right case end to flanges 103.

The embodiment of FIG. 4 differs from that of FIG. 2 in that the FIG. 4 embodiment has a pair of flow tubes 404 and 405 rather than a single flow tube 104 and a surrounding balance tube 116. A magnet and coil combination comprising driver D, vibrates flow tubes 404 and 405 out-of-phase with respect to each other in response to drive signals applied to driver D. Sensor S1 and S2 detect the Coriolis acceleration and displacement of the two flow tubes.

Each end 408 of flow tubes 404 and 405 is connected to manifold/flow diverter 406. In operation, the flowing material incoming to flow tube left portion 407 encounters diverter 406 causing the flowing material to be split between flow tubes 404 and 405. As the material approaches the right end of flow tubes 405 and 404, the material combines at 406 so that the total flow enters right flow tube element 407 which is connected to flange 103.

Flow tubes 404 and 405 are formed of the same material and are of the same physical dimensions so that they expand and contract axially and uniformly with respect to each other in response to thermal changes. The axial expansion/contraction of the flow tubes is resisted by left end element 109 but is transmitted to membranes 209 and 202 which are compliant. This enables them to accommodate the changes in the length of flow tubes 404 and 405 without imparting significant stress to the flow tubes. Since membranes 209 and 202 are compliant, they bow outwardly when the flow tubes expand as shown in FIG. 8. The compliance of membranes 202 and 209 also permits them to bow inwardly when flow tubes 404 and 405 contract due to a decrease in temperature.

Figure 5:
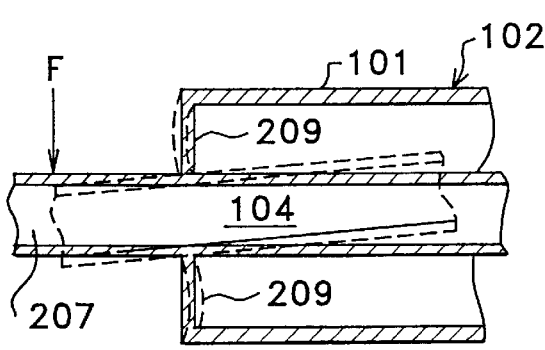
FIG. 5 illustrates bending torque and resultant tube deflection appearing on a flow tube whose case has a single end member.
Figure 6:
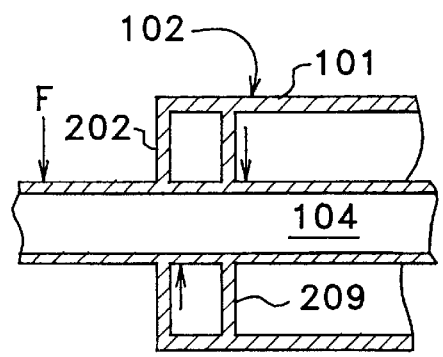
FIG. 6 discloses the bending torque and resisting forces on a single flow tube whose case has a double end member.

Description of FIGS. 5 and 6

The flowmeters of FIGS. 2 and 4 are provided with dual membranes for reasons best explained with references to FIGS. 5 and 6. FIG. 5 discloses a case 102 having a single membrane 209. FIG. 6 has a pair of membranes 209 and 202 at the left end of case 102. The dual end membranes of FIG. 6 protect flow tube 104 from the bending moments caused by external bending loads on the pipeline. Such loads are common and are caused by pipeline vibration and misalignment of pipe supports. On FIG. 5, it can be seen that the application of a force F to tube element 207 causes the single membrane 209 to bow outwardly at its upper portion and bow inwardly at its lower portion in response to the pivoting of flow tube 104 about the plane defined by the surface of membrane 209. This deflection is undesirable since it can impart a displacement to flow tube 104. This displacement of flow tube 104 by external forces is undesirable since it can permanently deform flow tube 104 and alter its response to the Coriolis force which is used to determine the flow rate for the material in flow tube 104.

The flowmeter of FIG. 6 has a pair of case members 202 and 209 at the left end of case 102 to protect flow tube 104 from externally induced forces appearing on flow tube element 207. The pair of membranes 202 and 209 are separated from each other a sufficient distance so as to prevent flow tube 104 from pivoting about the membranes as does flow tube 104 in FIG. 5. Although the membranes 202 and 209 are axially compliant, they have sufficient strength in a transverse planar direction to prevent flow tube 104 from moving downward or upwards on FIG. 6. They prevent such motion by supplying the flow tube 104 with sufficient force at the juncture with the membranes to counter the bending moment.

Description of FIG. 8

The embodiment of FIG. 8 is similar to that of FIG. 4 except that the right end case membranes 209 and 202 are shown in their outwardly flexed position as a result of an axial expansion of flow tubes 404 and 405 with respect to the case 102. FIG. 8 further shows sensors S1 and S2 and driver D connected over circuit paths 802, 803, and 804 to control circuit 801. Control circuit 801 applies signals over path 804 to cause driver D to vibrate flow tubes 404 and 405 out of phase with respect to each other. Control circuit receives output signals of sensors S1 and S2 over paths 802 and 803 representing the oscillations of flow tubes 404 and 405 resulting from the oscillations induced by driver D as well as by the Coriolis oscillations resulting from the flow of material through flow tubes 404 and 405.

FIG. 8 further discloses strain gage 806 connected over path 805 to control circuit 801. Control circuit 801 receives signals over path 805 indicative of the axial stress to which the flow tube element 809 is subjected. Strain gage 806 may be an element whose resistivity varies in accordance with the axial stress to which it is subjected. Strain gage 806 is fixably attached to flow tube element 809. The stress information provided by strain gage 806 is used by control circuit 801 for flowmeter applications requiring very high output information and accuracy.

Also shown on FIG. 8 is temperature sensor 808 affixed to the outer wall of flow tube 404. Temperature sensor 808 is connected by a conductor path 807 to control circuit 801 and transmits information to the control circuit 801 regarding the temperature of flow tube 404. Control circuit 801 receives temperature information from sensor 808 and strain gage information from element 806 and uses this information to correct for the accuracy of the output information generated by the flowmeter including volumetric flow rate and mass flow rate. The temperature of a flow tube alters its elastic modulus which, in turn, determines the stiffness of the flow tube. The stiffness of the flow tube is, in turn, alters the sensitivity of the flowmeter since a stiffer tube is less flexible than a tube having a lesser stiffness. The strain gage information is also used by the control circuit 801 to correct and improve the accuracy of the output information of the flowmeter. The strain gage information indicates the degree to which the flow tube is tensioned. The greater the tension on a flow tube, the stiffer and less sensitive it is. Conversely, the lesser the tension on the flow tube, the more flexible and more sensitive it is.

Control circuit 801 uses the information applied by temperature gage 808 and strain gage 806 in a manner that is well known in the art to increase the accuracy of the information outputed by the flowmeter above and beyond the accuracy that could be achieved by relying upon the information only from sensors S1 and S2.

Description of FIG. 9

FIG. 9 discloses single membrane 209 of case 102 that is relatively thin and compliant in accordance with the teaching of the present invention. It is shown without a flow tube through its central portion in order to illustrate its behavior in response to a temperature gradient in the absence of any forces applied by the flow tube. The stresses on membrane 209 resulting from a relatively higher temperature in its center portion 904 than its peripheral portion proximate flow tube wall 101 cause it to bow either inwardly or outwardly as shown by the dotted lines 901 and 902 on FIG. 9. By contrast, if the central portion 904 of membrane 209 is of lower temperature than its peripheral portion, the membrane remains flat and become tensioned like a drum head. This non-linear behavior with temperature gradient can result in small but unpredictable flow tube stresses if the flow tube end displacement due to thermal expansion does not coincide with the preferred displacement of the membrane due to thermal gradient. For example, when the flow tube is cooler than the case, the tube contracts while the membrane wants to remain flat. This results in slight stress in the flow tube along with small error in the measured flow rate.

Figure 10:
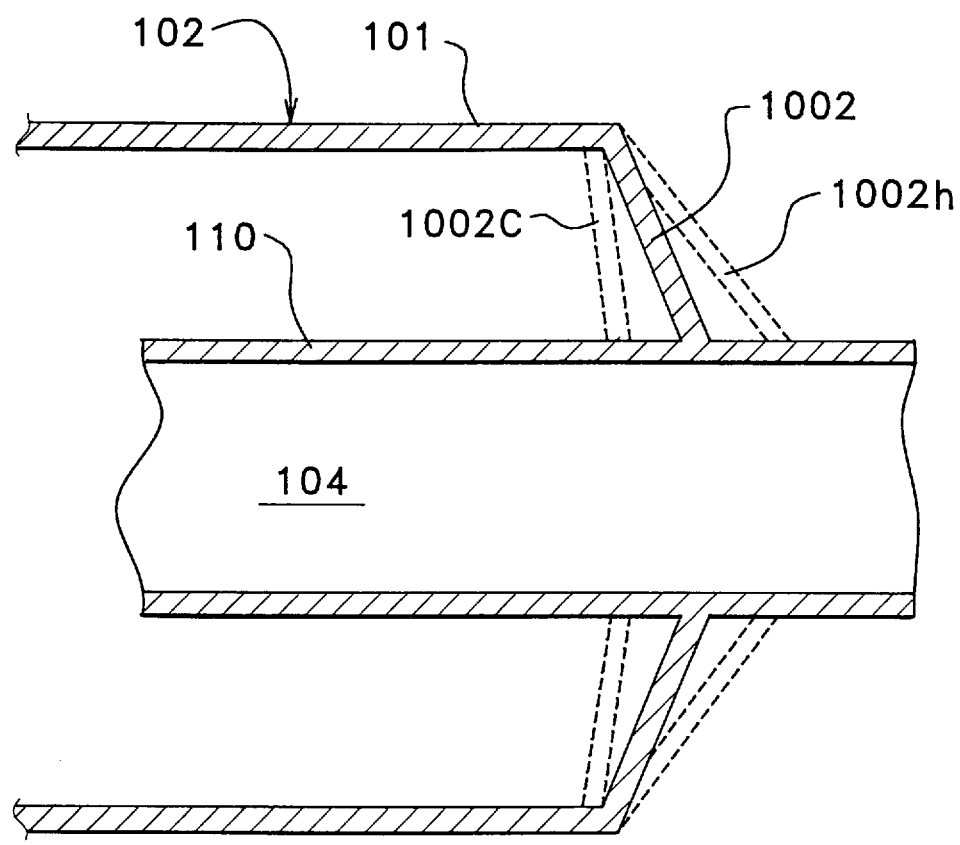
FIG. 10 discloses a possible embodiment of the case end termination member for the flowmeter of FIG. 2 along with displacement caused by flow tubes hotter and colder than the case.

Description of FIG. 10

FIG. 10 discloses a solution to the problem of the non-linear behavior of the flat case end membrane of FIG. 9 in response to thermal gradients. This embodiment of FIG. 10 comprises a flow tube 104 having a surrounding case 102 and case wall 101 together with a permanently bowed membrane 1002 connected to walls 110 of flow tube 104. The normal position of the membrane with no thermal gradient is represented by the solid lines 1002 which are permanently bowed outwardly with respect to case 102. This outwardly bowed shape eliminates the unpredictable and non linear behavior of the embodiment of FIG. 9. A positive thermal gradient (tube hotter than the case) causes the central portion to bow outward farther as shown for position 1002h while a negative thermal gradient causes the amount of bow to lessen to position 1002c. The amount of central displacement with a given temperature gradient can be determined by the initial (no gradient) amount of bow. With little initial bow the movement is relatively large, while for greater amounts of initial bow the movement with temperature gradient becomes smaller. The optimum amount of initial bow is that which causes the central portion of the membrane to displace the same amount as the flow tube end displaces relative to the case. For instance, if a 200 degree difference between the flow tube and the case causes the tube to increase its length by 0.036 more than the case, then the initial bow of the membrane should be set such that a 200 degree gradient between the case and the tube causes the central portion of the membrane to displace 0.036. Flow tube 104 can either contract or expand axially as shown on FIG. 10 in response to temperature changes of material within the flow tube. Simultaneously, the membrane responds to the thermal gradient by increasing its outward bowing if the tube is hotter than the case, or decreasing its outward bowing if the tube is colder than the case. FIG. 10 shows that for the proper design, the membrane movement just matches the tube differential expansion. With this design, the flow tube remains free from thermal stress. Even rapidly changing fluid temperature does not produce stress in the flow tube. If the fluid temperature suddenly rises by 200 degrees, the gradient across the case termination member rises as rapidly as the tube temperature and it bulges at the same rate as the tube grows. As the case starts to heat, it expands decreasing the length difference. The warming case, however, decreases the gradient across the end, resulting in the appropriate decrease in the bulge of the end.

Description of FIG. 11

FIG. 11 discloses an embodiment of the invention similar to that of FIG. 10 except that the embodiment FIG. 11 has a pair of case end membranes 1101 and 1102 at the end of case 102 while the embodiment of FIG. 10 has only a single case end membrane 1002. The pair of membranes 1101 and 1102 are permanently bowed outwardly on FIG. 11 and provide all the advantages discussed in connection with the description of the embodiment of FIG. 10. However, the pair of membranes 1101 and 1102 prevent a pivoting of the flow tube 104 in response to externally induced bending moments and advantageously insulate the flow tube from these moments for the same reasons discussed in detail in connection with the embodiment of FIG. 6 having a pair of case termination members at each end of flowmeter case 102.

The embodiment of FIG. 11 including element 1103 and flange 103 can advantageously be coupled to a pipeline system as shown in FIG. 3 wherein changes in the axial length of the flow tube 104 may be absorbed by right angle elements 313 and 314 of the pipeline to which the flowmeter of FIG. 13 may be coupled by means of flanges 103.

It is to be expressly understood that the claimed invention is not to be limited to the description of the preferred embodiment but encompasses other modifications and alterations within the scope and spirit of the inventive concept.

For example, the flowmeter case need not be cylindrical and, if desired, may be rectangular, triangular, or irregularly shaped. The case may comprise a sphere.

We claim:

1. A flowmeter comprising:

a case having a first and a second end;

a membrane means defining at least one end of said case;

a perimeter of said membrane means affixed to an inner wall portion of said case;

a substantially straight flow tube means positioned within and substantially parallel to said case and extending axially at a substantially constant diameter from within said case and through said membrane means to a terminus exterior to said case;

said flow tube means being affixed to said membrane means;

said membrane means comprises at least one membrane having a transverse dimension substantially greater than its thickness;

said membrane means having an axial compliance sufficient to enable said flow tube means to increase or decrease in length without permanent deformation in response to thermal changes of said flow tube means with respect to said case.

2. The flowmeter of claim 1 wherein said membrane means comprises a first membrane defining a first end of said case and a second membrane defining a second end of said case.

3. The flowmeter of claim 2 wherein said membrane means comprises a first pair of spaced apart membranes at a first end of said case and a second pair of spaced apart membranes at a second end of said case;

each pair of said spaced apart membranes being effective to prevent external bending moments of a pipe to which said flow tube means is connected from pivoting said flow tube means about a pivot point comprising said pair of spaced apart membranes.

4. The flowmeter of claim 1 wherein said membrane means comprises a first membrane defining a first end of said case and wherein said flowmeter further includes a rigid noncompliant member comprising a second end of said case.

5. The flowmeter of claim 1 wherein:

said membrane means has an axial compliance sufficient to enable it to flex axially inward and axially outward with respect to said case by an amount substantially equal to an increase and decrease in the length of said flow tube means resulting from thermal changes in said flow tube means.

6. The flowmeter of claim 1 wherein:

said membrane means has an axial compliance sufficient to enable it to flex axially with respect to said case by an amount substantially equal to changes in length of said flow tube means minus the changes in length of said case resulting from thermal changes in said flow tube means and said case.

7. The flowmeter of claim 1 wherein:

said membrane means has a permanently bowed surface oriented with its convex side outward from said case along a longitudinal axis of said flow tube means.

8. The flowmeter of claim 7 wherein:

said membrane means assumes an outward bowed convex position of increased curvature in response to a portion of said membrane means proximate said flow tube means having a higher temperature than the temperature of a portion of said membrane means proximate said case;

said membrane means assumes an outward bowed convex position of a decreased curvature in response to said portion of said membrane means proximate said flow tube having a lower temperature than said portion of said membrane means proximate said case.

9. The flowmeter of claim 1 wherein membrane means is sufficiently thin compared to its diameter so that it does not offer sufficient resistance to a lengthwise thermal expansion of said flow tube so as to exceed the yield stress of flow tube means when said flowmeter is operated within predetermined temperature limits.

10. The flowmeter of claim 1 wherein said membrane means is sufficiently thin with respect to its transverse dimension so that a higher temperature in its center portion than at its periphery causes said membrane means to be axially displaced when not connected to said flow tube means by an amount substantially equal to the amount that a center portion of said membrane means is axially displaced when connected to said flow tube means as said flow tube means changes in length when subjected to said thermal changes.

11. The flowmeter of claim 1 in combination with:

a balance bar positioned substantially parallel to said flow tube means;

balance bar membrane means connecting end portions of said balance bar to said flow tube means;

said flow tube means affixed to and extending through said balance bar membrane means;

said balance bar membrane means having an axial compliance sufficient to enable said flow tube means to change in length without permanent deformation in response to thermal changes in said flow tube means with respect to said balance bar.

12. The flowmeter of claim 11 wherein said balance bar is cylindrical and surrounds said flow tube means.

13. The flowmeter of claim 1 wherein said flow tube means comprises a single flow tube.

14. The flowmeter of claim 13 wherein said single flow tube is affixed to a balance bar positioned substantially parallel to said flow tube means.

15. The flowmeter of claim 1 wherein said flow tube means comprises a pair of parallel flow tubes.

16. The flowmeter of claim 1 wherein:

said flow tube means is substantially straight;

said case is cylindrical;

said membrane means is disk shaped;

said membrane means has a substantially flat surface;

said perimeter comprises a circumference of said disk shaped membrane means.

17. The flowmeter of claim 1 wherein:

said membrane means has an axial compliance sufficient to facilitate an increase and decrease in length of said flow tube means with respect to said case resulting from thermal changes of said flow tube means with respect to said case.

18. The flowmeter of claim 17 further comprising:

a control circuit for generating drive signals;

a driver coupled to said flow tube means for oscillating said flow tube means in response to said generation of said drive signals;

sensor means on said flow tube means for generating sensor output signals representing oscillations of said flow tube means;

means for applying said sensor means output signals to said control circuit;

a temperature detector on said flow tube means for generating output signals representing the temperature of said flow tube means;

means for applying said temperature detector output signals to said control circuit;

a strain gage on said flow tube means for generating output information representing the axial stress on said flow tube means;

means for applying said stress information to said control circuit;

said control circuit being responsive to a receipt of said sensor means output signals for generating output information of a first degree of accuracy regarding material flow in said flowmeter;

said control being responsive to a receipt of said temperature information and said stress information together with said sensor means output signals for generating output information of a higher degree of accuracy regarding said material flow in said flowmeter.

19. A flowmeter comprising:

a cylindrical case;

a disk like membrane means defining at least one end of said case and positioned inside said case perpendicular to a longitudinal axis of said case;

a perimeter of said membrane means affixed to an inner cylindrical wall portion of said case;

a substantially straight flow tube means having a substantially constant diameter positioned within said case parallel to the longitudinal axis of said case with end portions of said flow tube means extending at said substantially constant diameter through said membrane means to a terminus external to said case for coupling said flow tube means to a material source and a material receiver;

said membrane means having transverse dimension substantially greater than its thickness and having an axial compliance substantially large to enable said flow tube means to expand/contract axially without permanent deformation in response to thermal changes in said flow tube means with respect to said case.

* * * * *